United States Patent [19]
Downs et al.

[11] Patent Number: 5,828,838
[45] Date of Patent: Oct. 27, 1998

[54] METHOD AND APPARATUS FOR CONDUCTING MULTI-POINT ELECTRONIC CONFERENCES

[75] Inventors: Terry Downs, Forest Grove; Philip Lantz, Cornelius; Michael Maloney, Beaverton, all of Oreg.

[73] Assignee: Intel Corporation, Santa Clara, Calif.

[21] Appl. No.: 668,570

[22] Filed: Jun. 20, 1996

[51] Int. Cl.⁶ .................................................... G06F 11/00
[52] U.S. Cl. ............................. 395/200.34; 395/200.31; 395/200.35
[58] Field of Search ...................... 395/200.34, 200.35, 395/200.39, 200.31; 379/93.09, 93.11, 93.21; 370/259, 260, 267, 269; 345/330

[56] References Cited

U.S. PATENT DOCUMENTS

| | | | |
|---|---|---|---|
| 5,014,267 | 5/1991 | Tompkins et al. | 370/62 |
| 5,218,627 | 6/1993 | Corey et al. | 370/53 |
| 5,608,653 | 3/1997 | Palmer et al. | 395/200.34 |
| 5,673,080 | 9/1997 | Biggs et al. | 395/200.34 |
| 5,686,957 | 11/1997 | Baker | 395/200.34 |
| 5,696,763 | 12/1997 | Gang, Jr. | 370/390 |
| 5,729,684 | 3/1998 | Kuzma | 395/200.34 |
| 5,764,279 | 6/1998 | Ford et al. | 348/15 |
| 5,774,117 | 6/1998 | Kukkal et al. | 345/330 |

*Primary Examiner*—Mehmet B. Geckil
*Attorney, Agent, or Firm*—Blakely, Sokoloff, Taylor & Zafman

[57] ABSTRACT

A number of personal conferencing systems, each executing a personal conferencing application, are networked together in a peer-to-peer manner. Each personal conferencing application is provided with a multi-point control logic for contributing to the shared control of audio as well as video distribution among the conference participants. In one embodiment, the multi-point control logic of the various personal conferencing applications collectively enable audio and video to be distributed in a manner that dynamically takes into account the dialogue being engaged among the conference participants, e.g. the order in which the conference participants speak to each other.

28 Claims, 10 Drawing Sheets

METHOD AND APPARATUS FOR CONDUCTING MULTI-POINT ELECTRONIC CONFERENCES

BACKGROUND OF THE INVENTION

1. Field of the Invention

The present invention relates to the field of electronic conferencing. More specifically, the present invention relates to electronic conferencing among networked personal conferencing systems (PCSs).

2. Background Information

Advances in telecommunication and computing have enabled electronic conferences to be conducted using properly equipped personal conferencing systems, e.g. a computer system having the ProShare™ Data and Video Conference System[1] installed. Initially, electronic conferences were conducted on a point-to-point basis (hereinafter PP conferences), i.e. between two conference participants using two corresponding personal conferencing systems. Recent advances have further enabled multi-point electronic conferences (hereinafter MP conferences) to be conducted, i.e. among more than two conference participants using more than two corresponding personal conferencing systems. However, MP conference techniques known in the art all involve a multipoint control unit or MCU for controlling the MP conference, in particular, the audio and video distribution among the PCSs.

[1] ProShare™ is manufactured by Intel Corp. of Santa Clara, Calif., assignee of the present invention.

As the processing capacity of the individual personal conferencing systems continue to increase, it is desirable to "distribute" the multi-point control function to the individual personal conferencing systems, thereby allowing multi-point personal conferences to be conducted in an even more cost effective manner, without the MCU. As will be disclosed in more detail below, the present invention achieves these and other desirable results.

SUMMARY OF THE INVENTION

A number of PCSs, each executing a personal conferencing application (PCA), are networked together in a peer-to-peer manner. In accordance with a first aspect of the present invention, each PCA is provided with multi-point control logic for contributing to the shared control of audio as well as video distribution among the conference participants of the various PCSs. Preferably, the multi-point control logic of the various PCAs collectively enable audio and video to be distributed in a manner that dynamically takes into account the dialogue being engaged in among the conference participants, e.g. the order in which the conference participants speak to each other.

In one embodiment, each multi-point control logic allows audio out to be multicast only when speech is present in the audio out signals, otherwise audio out signals are discarded. Similarly, each multi-point control logic also allows video out to be multicast only when its PCS is the current holder of a video token, which is passed among the multi-point control logic of the PCSs, substantially in accordance with which PCS is the current speaking PCS. Additionally, each multi-point control logic further allows video out to be sent to the PCS who is the current video token holder, if its PCS is the immediate predecessor video token holder.

In accordance with a second aspect of the present invention, in addition to its control logic for cooperatively controlling logical connection of a PP conference, connection control logic of the PCA is further enhanced with control logic for distributively controlling logical connections of a MP conference. Preferably, the enhancements include control logic for logically connecting a conference participant to an in progress PP conference, and enlarging the PP conference into a MP conference, as well as logically disconnecting a conference participant from a three-party MP conference, and reducing the MP conference back to a PP conference.

BRIEF DESCRIPTION OF THE DRAWINGS

The present invention will be described by way of embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details provided. In other instances, well-known features are omitted or simplified in order not to obscure the present invention.

Parts of the description will be presented in terms of operations performed by a computer, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
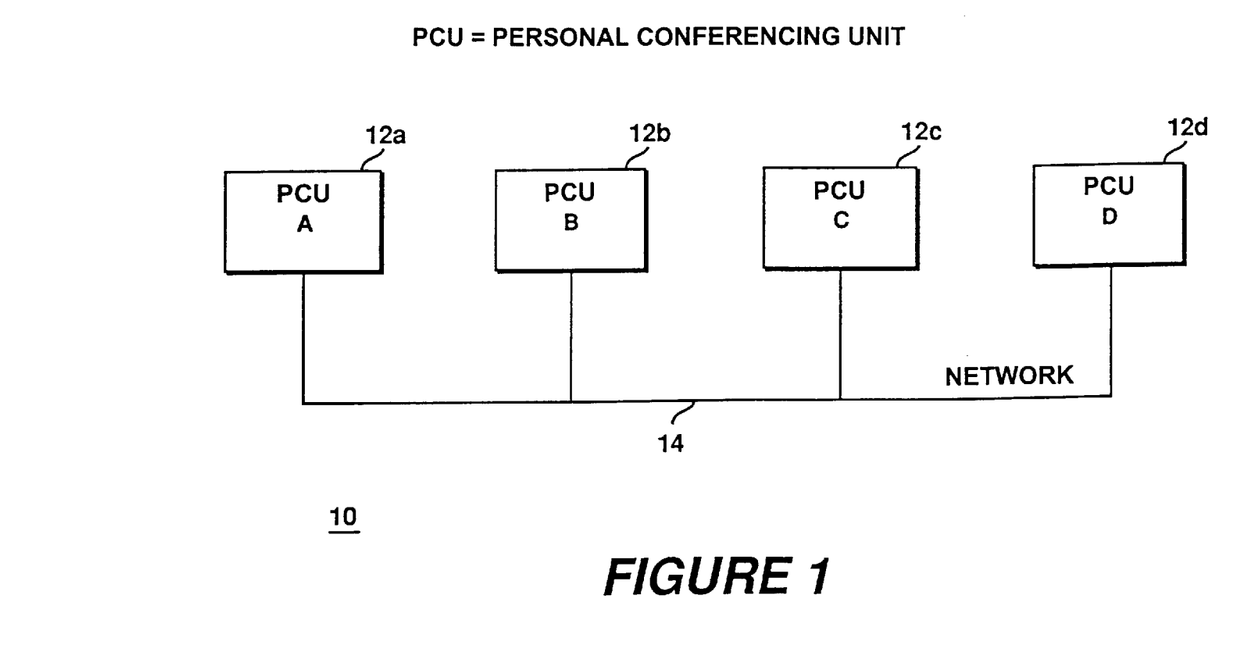
FIG. 1 is a block diagram illustrating a typical network of PCSs incorporating the teachings of the present invention.

Referring now to FIG. 1, one embodiment of a network of PCSs 10 incorporating the teachings of the present invention is illustrated. For the illustrated embodiment, PCS Network 10 comprises a number of PCSs 12a–12d coupled to each other via a peer-to-peer network 14. As will be described in more detail below, any two of the conferencing systems 12a–12d may engage each other in a PP conference, or any three or more of the conferencing systems 12a–12d may engage each other in a MP conference. Unlike the prior art, the MP conference is conducted without the employment of a multi-point control unit (MCU).

Any number of peer-to-peer networks well-known in the art, including but not limited to Ethernet, may be employed to couple PCSs 12a–12d to each other. Accordingly, peer-to-peer network 14 will not be further described.

Figure 2:
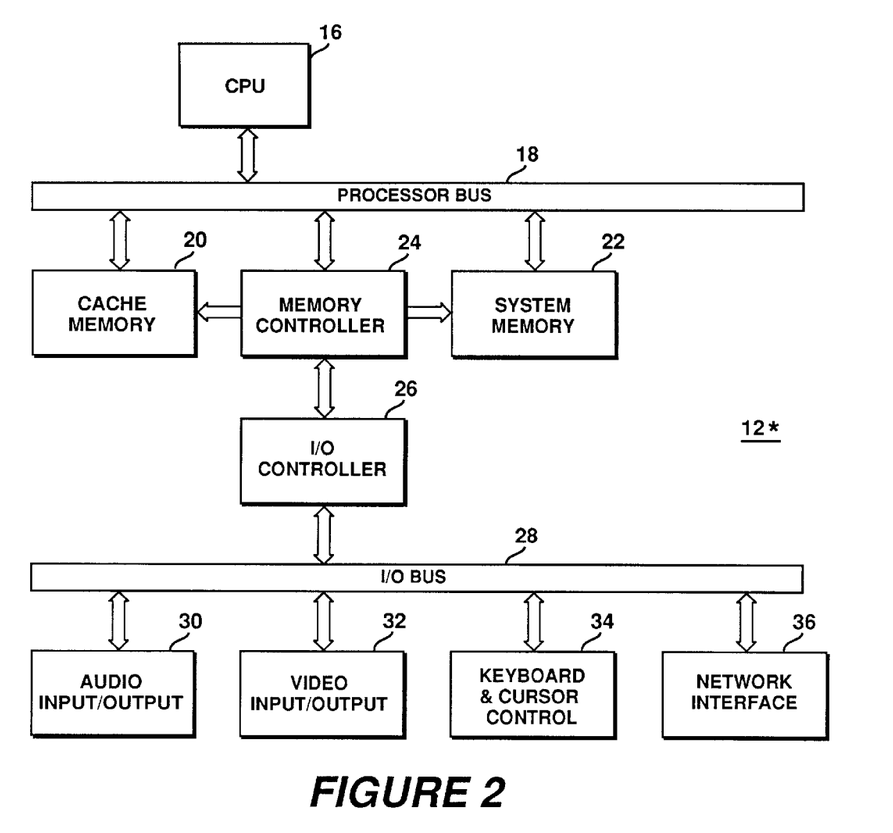
FIG. 2 is a block diagram illustrating a hardware view of one embodiment of one of the PCSs of FIG. 1.

FIG. 2 illustrates a hardware view of one embodiment of one of the PCSs 12a, 12b, 12c, or 12d (hereinafter 12*). For the illustrated embodiment, PCS 12* comprises CPU 16, cache memory 20, system memory 22, memory controller 24 and processor bus 18 coupled to each other as shown. Additionally, PCS 12* further comprises input/output (I/O) controller 26, audio I/O devices 30, video I/O devices 32, keyboard and cursor control devices 34, network interface 36, and I/O bus 28 coupled to each other and the earlier described elements as shown. Audio I/O devices 30 may include a microphone and speakers/headphones, whereas video I/O devices 32 may include a video display and a video camera. Network interface 36 includes circuitry in support of the peer-to-peer connection. PCS 12* is intended to represent a broad range of high performance computer based electronic conferencing systems including but not limited to systems based on Pentium™ processors, manufactured by Intel Corp. of Santa Clara, Calif., assignee of the present invention.

Figure 3:
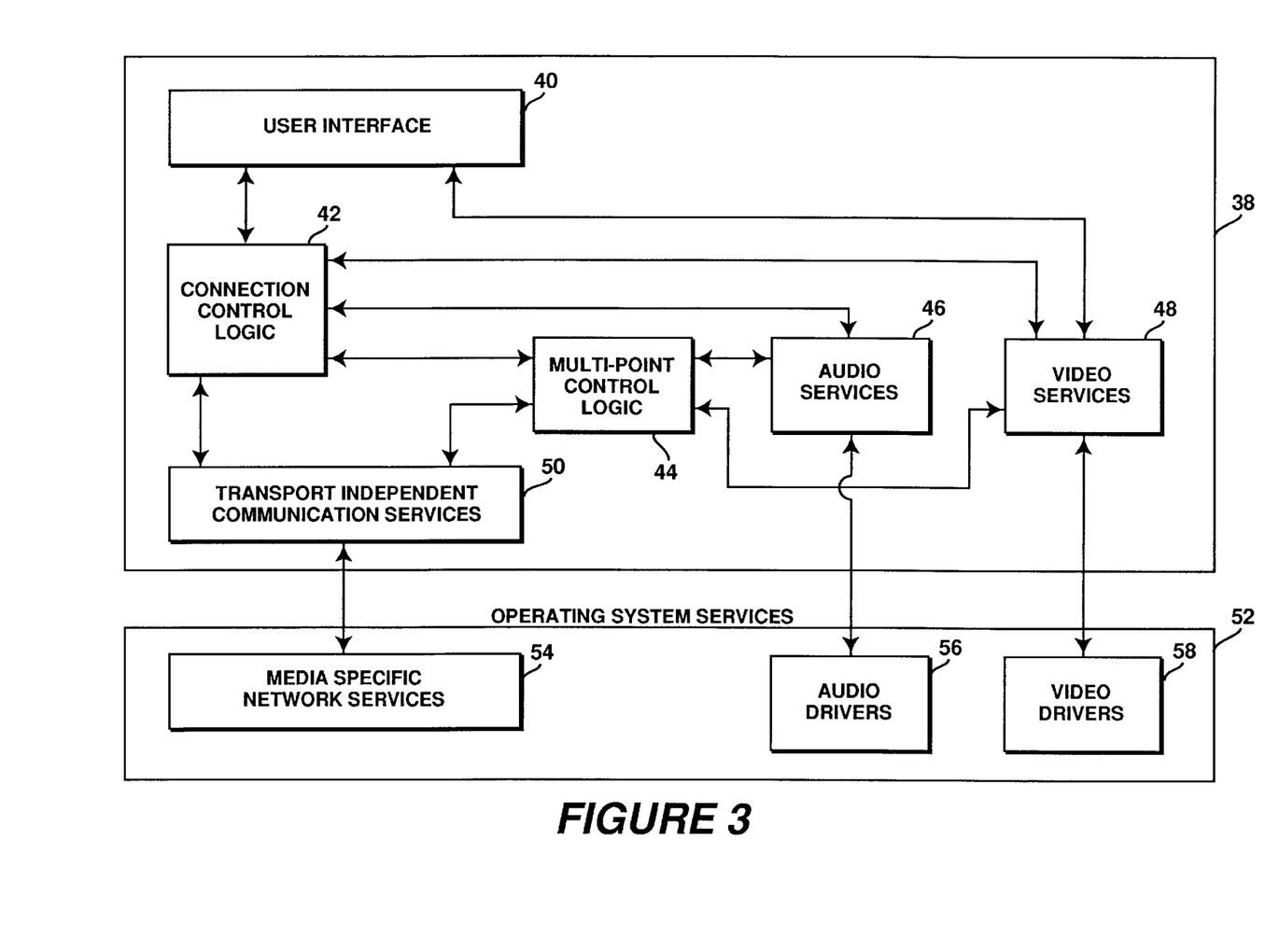
FIG. 3 is a block diagram illustrating a software view of one embodiment of one of the PCSs of FIG. 1, including one embodiment each of the enhanced connection control logic and the multi-point control logic in accordance with the present invention.

FIG. 3 illustrates a software view of one embodiment of one of the PCSs 12*. For the illustrated embodiment, each PCS 12* includes PCA 38 and operating system services 52. As will be described in more detail below, in accordance with the present invention, PCA 38 manages PP conferences as well as shares the management responsibilities of MP conferences. Operating system services 52 provide conventional operating system services well-known in the art. In particular, operating system services 52 provide media specific communication services in support of a transport protocol that allows multicasting of messages to a number of remote recipients through the use of a multicast identifier voluntarily subscribed to by the remote recipients. A particular example of such transport protocol is the IP Multicast Internet Protocol. Operating system services 52 also include audio and video drivers 54 and 56 for accessing the audio and video resource of the PCS 12*.

For the illustrated embodiment, PCA 38 also includes user interface 40, enhanced connection control logic 42, multi-point control logic 44, audio and video services 46 and 48, and transport independent communication services 50. User interface 40 serves its conventional purpose of interfacing with the user of the PCS 12*, which is well-known in the art. Enhanced connection control logic 42 performs its conventional function of cooperatively controlling a point-to-point logical connection with the counterpart PCS 12*. Additionally, in accordance with the present invention, enhanced connection control logic 42 also shares control of multi-point logical connections with the counterpart PCSs 12*. Enhanced connection control logic 42 includes connection status and control data denoting the system's status and current values of various control variables. In particular, connection status and control data include data denoting whether the PCS 12* is in conference, and if the system is in conference, whether it is engaged in a PP conference or whether it is engaged in a MP conference.

In accordance with the present invention, multi-point control logic 44 shares control of audio and video distribution among conference participants. Multi-point control logic 44 includes working data for sharing the control of audio and video distribution. For the illustrated embodiment, the working data include data denoting whether the PCS 12* is the current holder of a video token, when did the PCS 12* first become the current video token holder, when was the last time the user spoke. Multi-point control logic 44, the enumerated working data, and their usage will be described in more detail below. For the purpose of this patent application, the current video token holder is also referred to as the current "primary video source".

For the illustrated embodiment, transport independent communication services 50 perform its conventional function of facilitating invocation of the operating system's media specific communication services 54. Audio and video services 46 and 48, except for their cooperation with multi-point control logic 44 also perform their conventional functions of providing audio and video services, including audio and video compression and decompression, and invoking operating system services' 50, and audio and video drivers 56 and 58 to render audio and video. These services are well-known and will not be further described.

Before describing the enhancements provided to connection control logic 42, and multi-point control logic 44 in detail, we first skip to FIGS. 9a–9c and 10a–10c, wherein sample joining and severing of conference participants (i.e. the PCSs 12a–12d with electronic conferences in accordance with the present invention are illustrated. For ease of explanation, FIGS. 9a–9c will be described with one of the PCS 12* being referred to as the "top provider" of an electronic conference. For the purpose of this patent application, the "top provider" of an electronic conference refers to the PCS who initiated an electronic conference, and handles communication between the connected PCSs, when a PCS joins or leaves the electronic conference. However, based on the description to follow, it will be appreciated by those skilled in the art that the present invention may be practiced with or without a conference "top provider", i.e. with the joining conference participant calling anyone of the conference participants to join the conference in progress, or a conference participant calling a non-participant to join the non-participant.

Figure 9A:
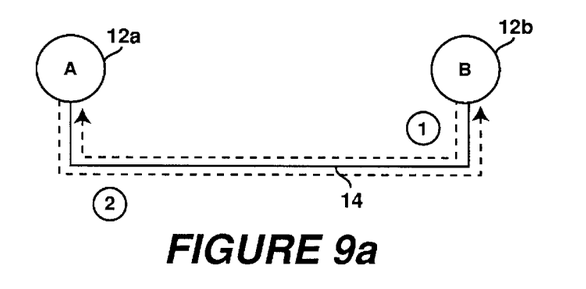
FIGS. 9a–9c are logic flow diagrams illustrating sample joining of conference participants to electronic conferences in accordance with the present invention.
Figure 9B:
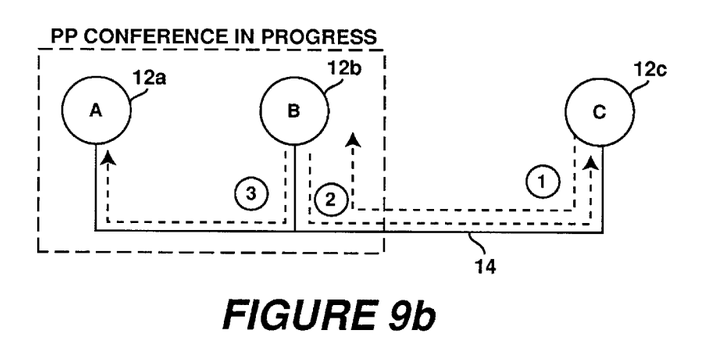

As illustrated in FIG. 9a, in accordance with the present invention, two "unconnected" PCSs 12a–12b may join each other in a PP conference. PCS B 12b may join PCS A 12a by sending a message to PCS A 12a requesting connection. In response, PCS A 12a may reply to PCS B 12b, establishing the point-to-point logical connection. However, as illustrated in FIG. 9b, in accordance with the present invention, an "unconnected" PCS 12c may also join two other PCSs 12a–12b engaged in a PP conference, and convert the PP conference into a MP conference. PCS C 12c may join PCSs A & B 12a–12b by sending a message to PCS B 12b requesting connection, "B" being the "top provider" of the conference in progress. In response, PCS B 12b may reply to PCS C 12c, establishing a multi-point logical connection. Additionally, PCS B 12b may send a message to PCS A 12a instructing PCS A 12a to "convert" its point-to-point logical connection with "B" 12b to a multi-point logical connection.

Figure 9C:
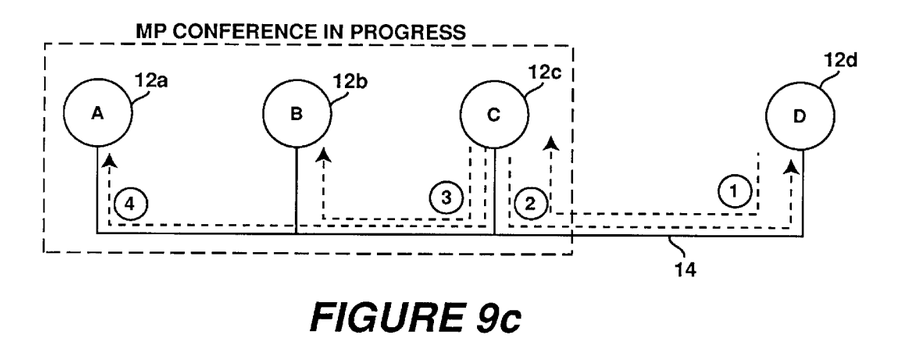

Additionally, as illustrated in FIG. 9c, in accordance with the present invention, an "unconnected" PCS 12c may also join three other PCSs 12a–12c engaged in a MP conference, and enlarging the MP conference. PCS D 12d may join PCSs A, B & C 12a–12c by sending a message to PCS C 12c requesting connection, PCS C 12c being the "top provider". In response, PCS C 12c may reply to PCS D 12d, establishing a multi-point logical connection. Additionally, PCS C 12c may send a message to PCS A 12a and a message to PCS B 12b, instructing PCS A & B 12a–12b to enlarge their multi-point logical connections to include "D".

Figure 10A:
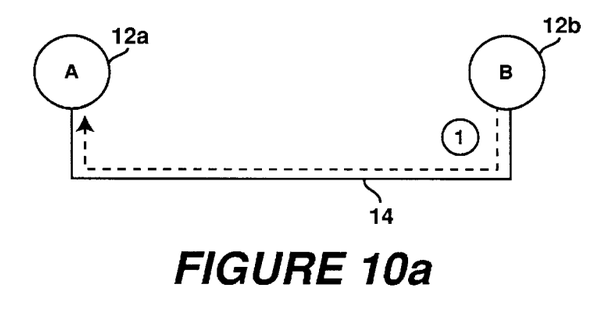
FIGS. 10a–10c are logic flow diagrams illustrating sample severing of conference participants from electronic conferences in accordance with the present invention.
Figure 10B:
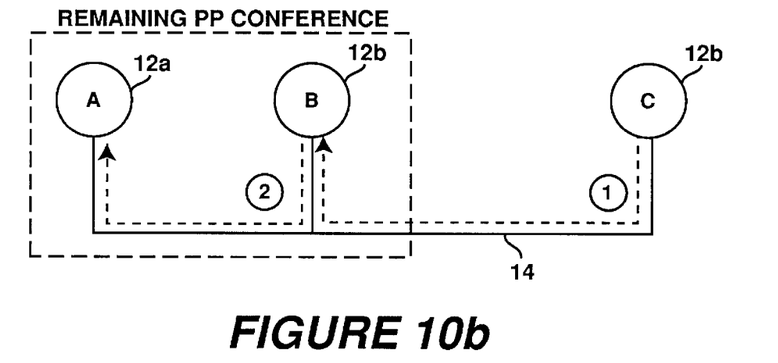

With respect to severing from a multi-point conference, as illustrated in FIG. 10a, in accordance with the present invention, a PCS 12b may sever itself from a PP conference in a conventional manner. PCS B 12b may send a message to PCS A 12a informing "A" of "B's" departure. However, as illustrated in FIG. 10b, in accordance with the present invention, a PCS 12c may also sever itself from a MP conference, leaving behind a PP conference between two remaining PCSs 12a–12b. PCS C 12c may send a message to PCS B 12b informing "B" of "C's" departure, "B" being the "top provider". PCS B 12b in turn may send a message to PCS A 12a informing "A" of "C's" departure, instructing "A" to change the multi-point logical connection to a point-to-point logical connection.

Figure 10C:
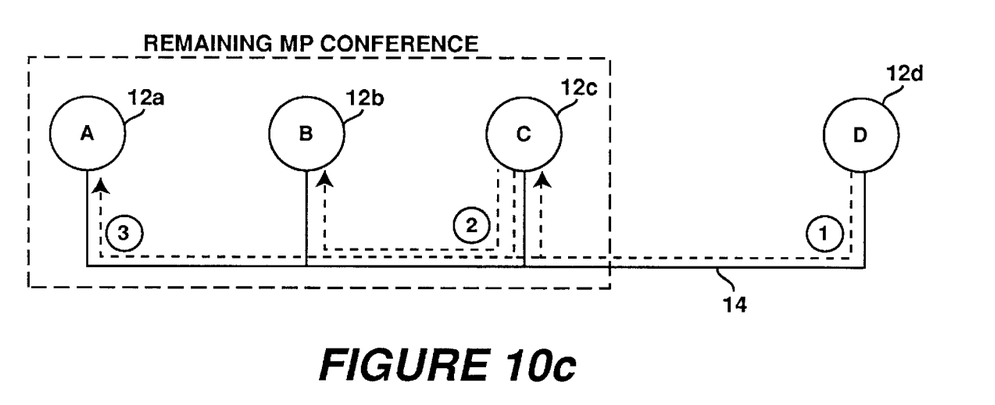

Lastly, as illustrated in FIG. 10c, in accordance with the present invention, a PCS 12d may also sever itself from a MP conference, leaving a "smaller" MP conference between the remaining PCSs 12a–12c. PCS D 12d may send a message to PCS C 12c informing "C" of "D's" departure, "C" being the top provider. PCS C 12c in turn sends a message to PCS A 12a and a message to PCS B 12b informing "A" and "B" of "D's" departure.

Having now described various sample joining and severing of conference participants with electronic conferences in accordance with the present invention, we now refer back to FIGS. 4a–4c and 5a–5b, wherein one embodiment of the operational flow of an embodiment of enhanced connection control logic 42 for distributively controlling the joining and severing of conference participants with personal conferences is shown. For the illustrated embodiment, the functions of enhanced connection control logic 42 are implemented on an event driven basis. Furthermore, the functions are implemented in an object oriented manner.

Figure 4A:
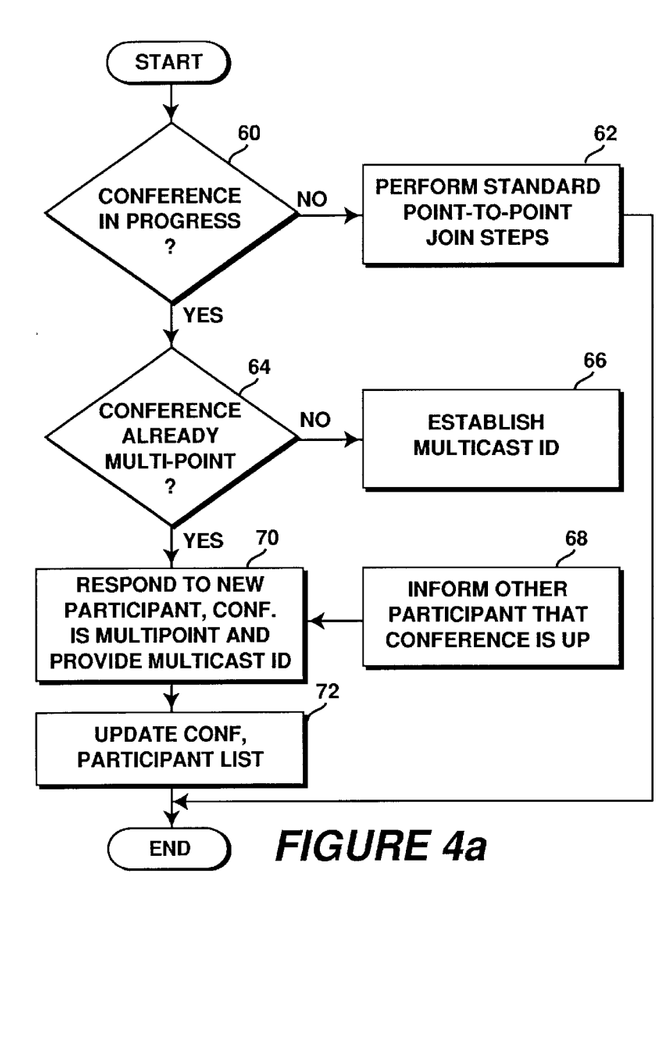
FIGS. 4a–4c are logic flow diagrams illustrating one embodiment of the operational flow of the enhanced connection control logic of FIG. 3 for distributively controlling the joining of conference participants in accordance with the present invention.

For the illustrated embodiment, as shown in FIG. 4a, connection control logic 42 is enhanced to first check to determine if the PCS 12* is already a conference participant of an electronic conference, in response to a conference joining connection request event, step 60. Enhanced connection control logic 42 would proceed to respond to the conference joining connection request in a conventional manner, if the PCS 12* is not already a conference participant of an electronic conference, step 62. However, if the PCS 12* is already a conference participant of an electronic conference, enhanced connection control logic 42 would further determine if the electronic conference in progress is already a MP conference, step 64.

If the electronic conference in progress is not already MP conference, enhanced connection control logic 42 would proceed to establish a multicast identifier, step 66, and inform the counterpart PP conference participant that the conference is going to become a MP conference, step 68. Regardless, whether the electronic conference in progress is already a MP conference, enhanced connection control logic 42 would respond to the new conference participant informing the new conference participant that the conference is going to be multi-point and provide the multicast identifier, step 70. Furthermore, enhanced connection control logic 42 would update the conference participant list, step 72.

Figure 4B:
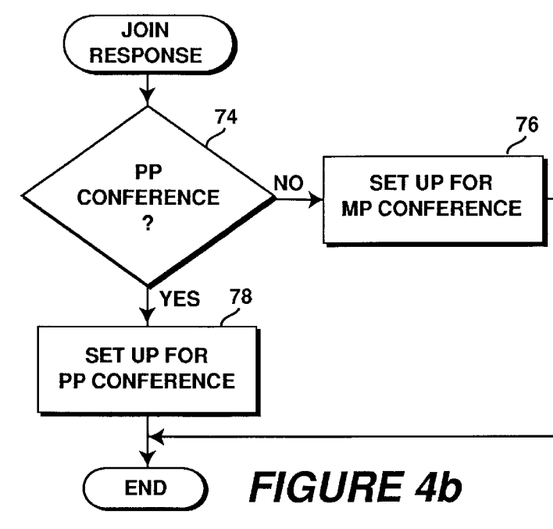
Figure 4C:
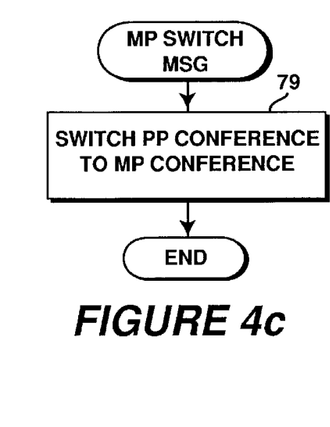

For the illustrated embodiment, as shown in FIG. 4b, in response to a join response, enhanced connection control logic 42 would check to determine if the electronic conference is going to be point-to-point or multi-point, step 74, and set up the electronic conference accordingly in a conventional manner, step 76 or 78. For the illustrated embodiment, as shown in FIG. 4c, in response to a message to switch from a PP to a MP conference, enhanced connection control logic 42 would switch its internal conference setting accordingly, step 79.

Figure 5A:
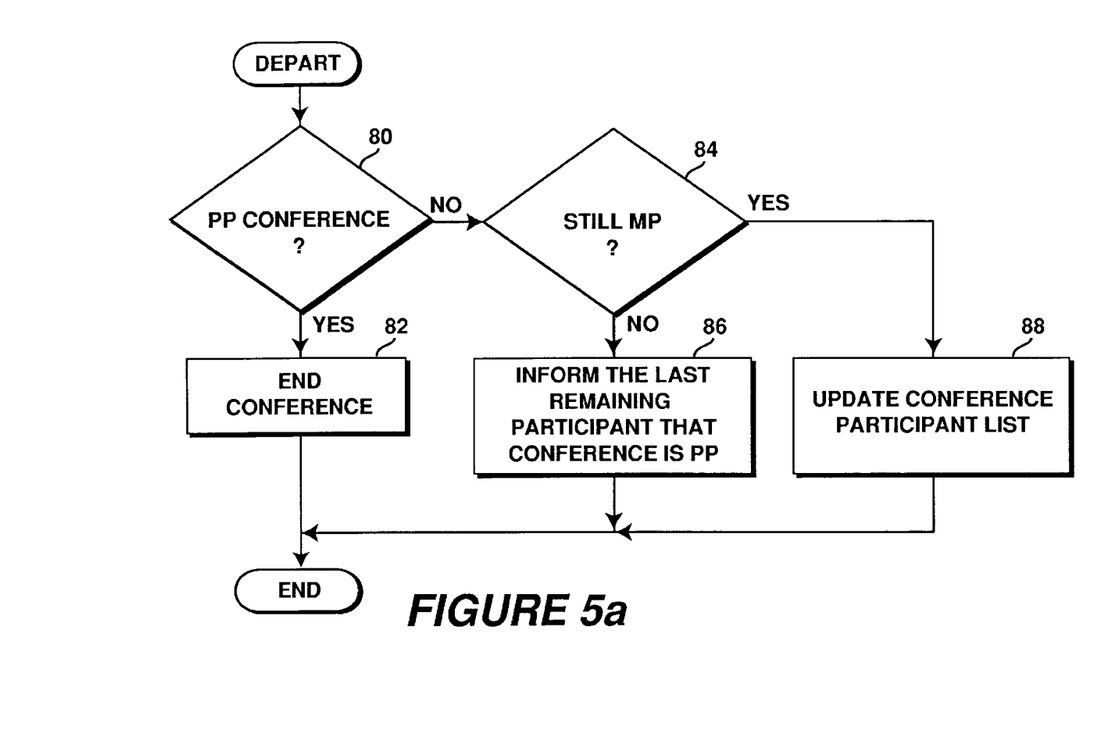
FIGS. 5a–5b are logic flow diagrams illustrating one embodiment of the operational flow of the enhanced connection control logic of FIG. 3 for distributively controlling the severing of conference participants in accordance with the present invention.
Figure 5B:
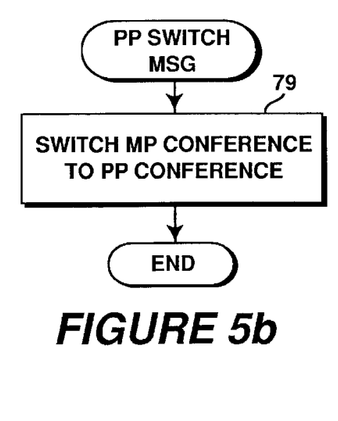

For the illustrated embodiment, as shown in FIG. 5a, in response to a conference participant departing event, enhanced connection control logic 42 would first determine if the electronic conference in progress is a PP conference, step 80. If the electronic conference in progress is a PP conference, enhanced connection control logic 42 would terminate the electronic conference in a conventional manner, step 82. On the other hand, if the electronic conference in progress is a MP conference, enhanced connection control logic 42 would further determine whether the electronic conference is still multi-point without the departing conference participant, step 84. If the conference would no longer be multi-point without the departing conference participant, enhanced connection control logic 42 would inform the remaining conference participant to switch from MP conference to PP conference, step 86. On the other hand, if the conference would still be multi-point, enhanced connection control logic 42 would simply update the conference participant list, removing the departed conference participant, step 88. For the illustrated embodiment, as shown in FIG. 5b, in response to a message to switch from MP to PP conference, enhanced connection control logic 42 would switch its internal conference setting accordingly, step 89.

Having now also described the operational flow for joining and severing conference participants under the present invention, we now refer to FIGS. 6a–6b, 7a–7b, and 8, wherein one embodiment of the operational flow of multi-point control logic 44 for distributively controlling the distribution of audio and video among the conference participants is shown. For the illustrated embodiment, the functions of multi-point control logic 44 is implemented on an event driven basis. Furthermore, the functions are implemented in an object oriented manner. The description will refer to a "video token", which for the purpose of this patent application, denotes the holder as the current primary video source. There is only one "video token", and is passed among the various PCSs 12a–12d, during an electronic conference.

Figure 6A:
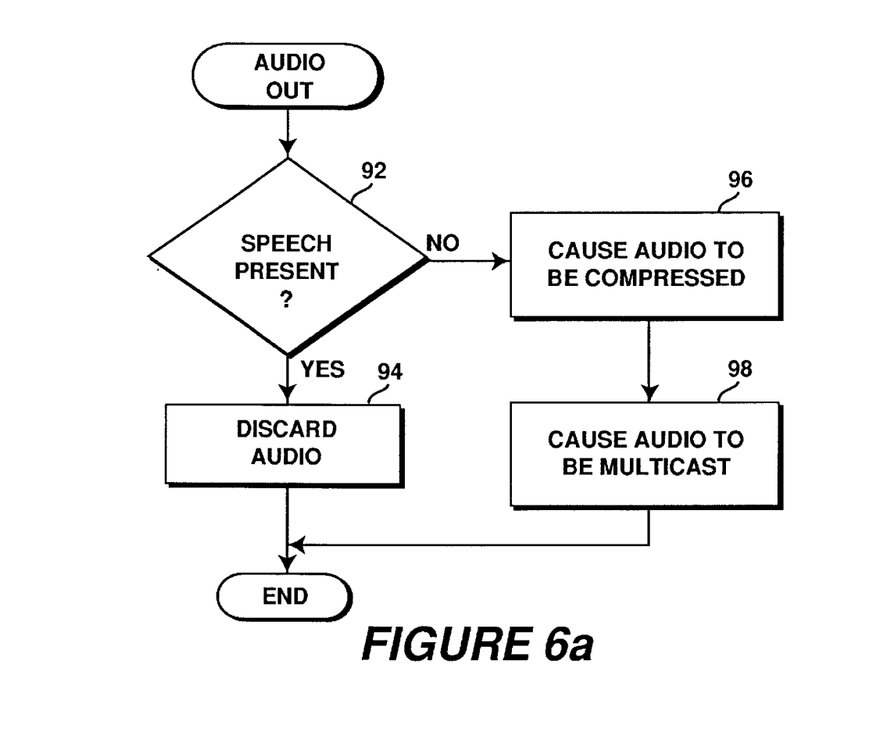
FIGS. 6a–6b are logic flow diagrams illustrating one embodiment of the operational flow of the multi-point control logic of FIG. 3 for distributively controlling audio distribution in accordance with the present invention.

For the illustrated embodiment, as shown in FIG. 6a, for audio out, multi-point control logic 44 first determines if speech is present in the audio-out signals, step 92. Presence of speech in an audio output signal stream may be determined in one of a number of approaches known in the art. If speech is determined to be not present, the "audio out" are discarded, step 94. On the other hand, if speech is present, multi-point control logic 44 would request audio services 46 to compress the audio data, step 96, and then request communication services 50 to multicast the compressed audio data to all conference participants using the multicast identifier.

Figure 6B:
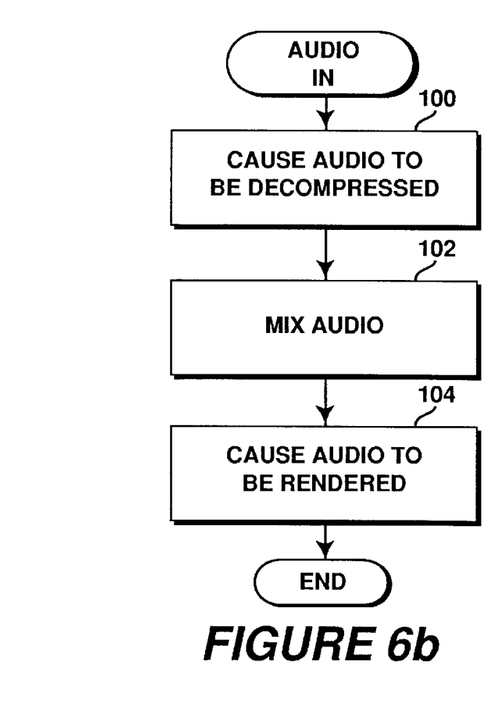

For the illustrated embodiment, as shown in FIG. 6b, for audio in, multi-point control logic 44 is equipped to request audio services 46 to decompress in-bound audio data streams, mix the decompressed audio data streams into a single audio data stream, and render the mixed audio, during a multi-point personal conference, steps 100, 102 and 104. In one embodiment, multi-point control logic 44 is equipped to request decompression, mixing and rendering of only a predetermined number of in-bound audio data streams. The in-bound audio data streams to be decompressed, mixed with each other, and then rendered, may be selected on a first-come first-serve basis. As will be appreciated by those skilled in the art, seldom do all conference participants of a MP conference speak at the same time, and if they do, their speech are likely to be incomprehensible anyway. Thus, by requesting only a finite number of audio streams to be decompressed, mixed with each other, and rendered, implementation can be simplified without significant compromise to audio quality.

Figures 7A, 7B:
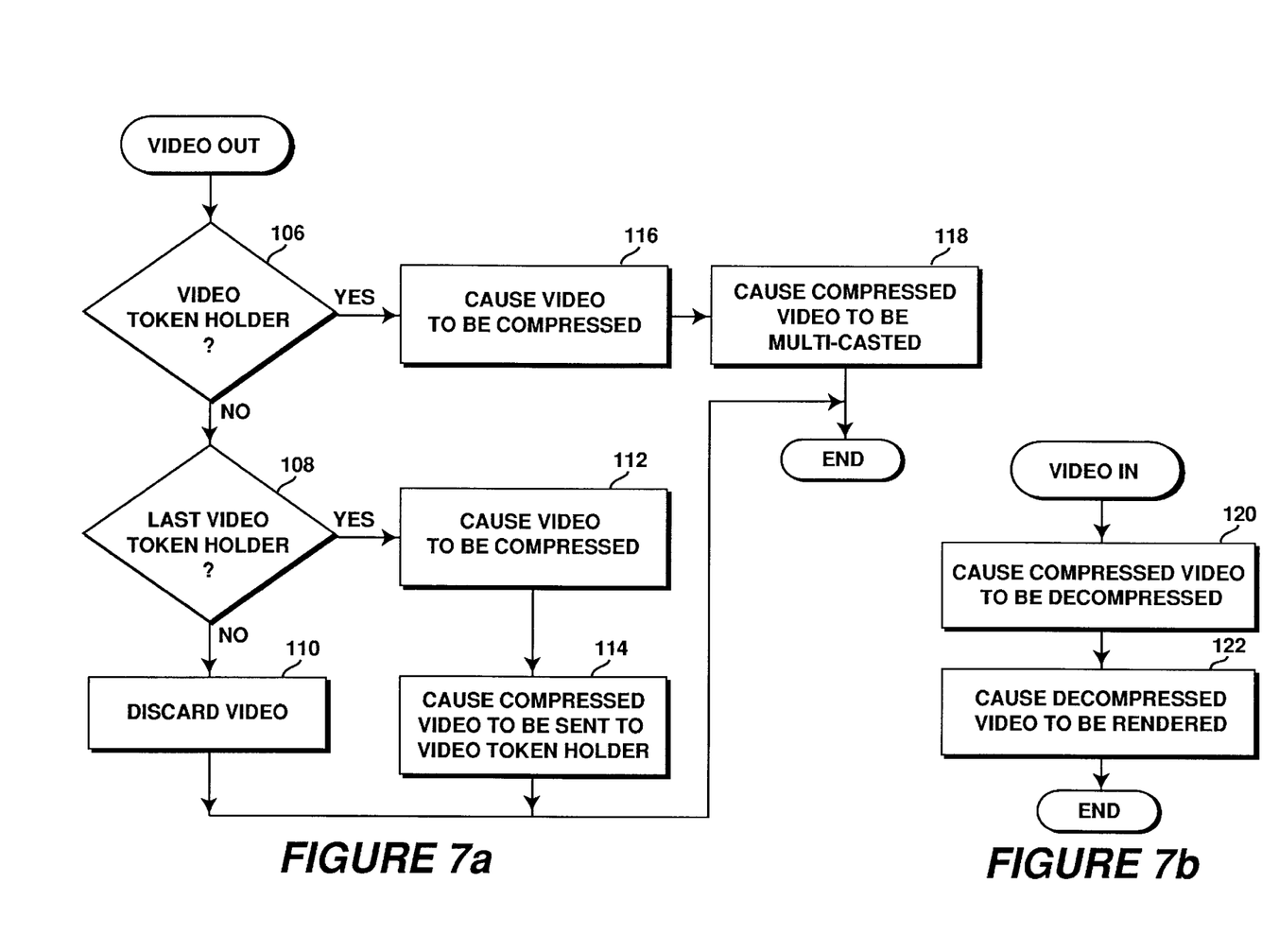
FIGS. 7a–7b are logic flow diagrams illustrating one embodiment of the operational flow of the multi-point control logic of FIG. 3 for distributively controlling video distribution in accordance with the present invention.

For the illustrated embodiment, as shown in FIG. 7a, for video out, multi-point control logic 44 is equipped to determine whether the PCS 12\* is the current video token holder, i.e. the current primary video source, during a MP conference, step 106. If it is determined that the PCS 12\* is the current video token holder, multi-point control logic 44 would request video services 48 to compress the outbound video data, and multicast the compressed outbound video data to the conference participants, using the multi-cast ID, steps 116 and 118.

On the other hand, if it is determined that the PCS 12\* is not the current video token holder, multi-point control logic 44 would determine whether the PCS 12\* is the immediate predecessor to the current video token holder, i.e. the immediately preceding primary video source, step 108. If it is determined that the PCS 12\* is the immediate predecessor to the current video token holder, multi-point control logic 44 would request video services 48 to compress the outbound video data, and point-to-point transmit the compressed outbound video data to the current video token holder, steps 112 and 114.

Finally, if it is determined that the PCS 12\* is neither the current nor the immediate predecessor to the current video token holder, multi-point control logic 44 would discard the outbound video, step 110.

For the illustrated embodiment, as shown in FIG. 7b, multi-point control logic 44 is equipped to request video service 48 to decompress in-bound video, and render the decompressed in-bound video, as in PP conference, steps 120 and 122.

Figure 8:
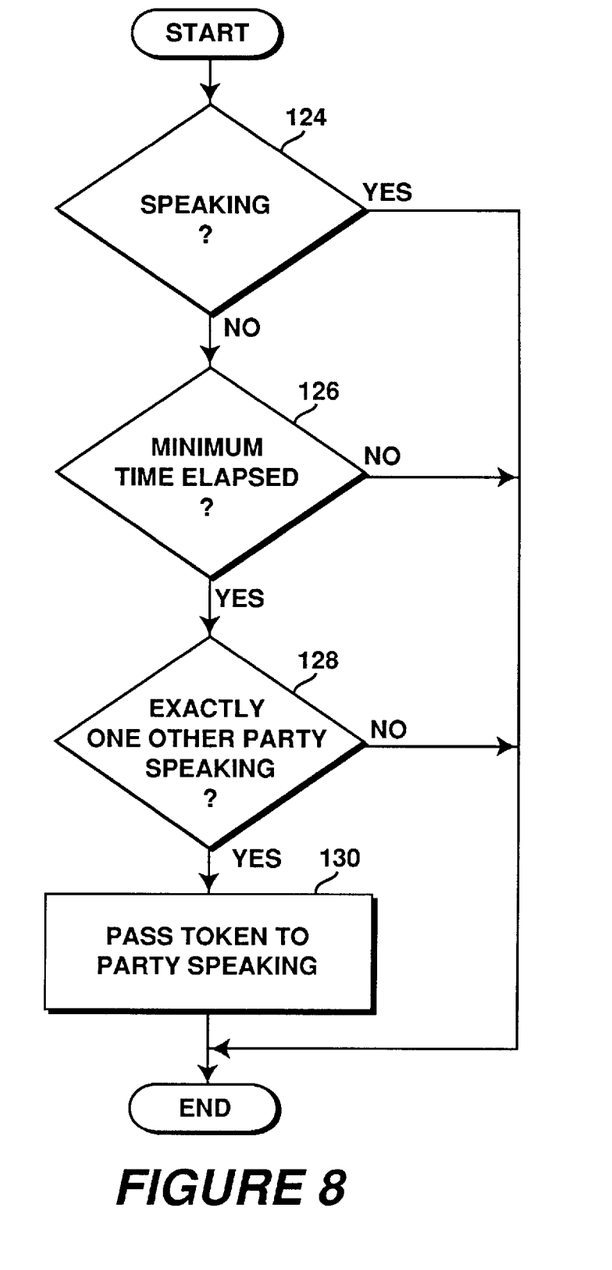
FIG. 8 is a logic flow diagram illustrating one embodiment of the operational flow for distributively controlling the passing of a video token among the conference participants in accordance with the present invention.

For the illustrated embodiment, as shown in FIG. 8, multi-point control logic 44 is further equipped to determine from time to time when to pass on the video token to another PCS, when its PCS is the current video token holder. Preferably, the determination is made for each audio packet. As shown, multi-point control logic 44 first determines if the user is speaking, step 124. If the user is speaking, the video token is not passed. On the other hand, if the user is not speaking, multi-point control logic 44 further determines if one or more predetermined timing thresholds have been met. Preferably, the predetermined timing thresholds include both a first predetermined amount of time the user should hold the video token, before the video token is eligible for passing, as well as a second predetermined amount of time speech is determined to be not present in the audio out signals, before the user is considered to have stopped speaking. If all timing thresholds have been met, step 126, multi-point control logic 44 then determines if exactly one participant is speaking, step 128. If exactly one participant is speaking, multi-point control logic request communication services to pass the video token to the speaking participant, step 130. As will be appreciated by those skilled in the art, ensuring the video token is held for a predetermined of time, reduces "flashing" of video images.

Thus, a method and apparatus for conducting multi-point electronic conferences has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A personal conferencing unit comprising integrated multi-point control logic that operates to cooperate with integrated multi-point control logic of at least a second and a third personal conferencing unit to collectively control audio and video distribution among the at least three personal conferencing units during a multi-point electronic conference between the at least three personal conferencing units.

2. The personal conferencing unit as set forth in claim 1, wherein during the multi-point electronic conference, the integrated multi-point control logic allows outbound audio on the personal conferencing unit to be multi-cast to a multi-cast destination address, when speech is present in the outbound audio, the multi-cast destination address being voluntarily subscribed to by the at least second and third personal conferencing units.

3. The personal conferencing unit as set forth in claim 1, wherein during the multi-point electronic conference, the integrated multi-point control logic allows a plurality of in-bound audio streams from the at least second and third personal conferencing units to be mixed together, and rendered.

4. The personal conferencing unit as set forth in claim 3, wherein during the multi-point electronic conference, the integrated multi-point control logic allows only a selected subset of the in-bound audio streams from the at least second and third personal conferencing units to be mixed together, and rendered, and allows the remaining in-bound audio streams from the at least second and third personal conferencing units to be discarded.

5. The personal conferencing unit as set forth in claim 1, wherein during the multi-point electronic conference, the integrated multi-point control logic allows outbound video to be multi-cast to a multi-cast destination address units if a user of the personal conferencing unit is speaking, the multi-cast address being voluntarily subscribed to by the at least second and third personal conferencing units.

6. The personal conferencing unit as set forth in claim 1, wherein during the multi-point electronic conference, the integrated multi-point control logic allows outbound video to be point-to-point transmitted to one of the at least second and third personal conferencing units if a user of the personal conferencing unit is an immediate predecessor speaker to another user of of one of the at least second and third personal conferencing units who is currently speaking, the address of the point-to-point transmission being the one of the at least second and third personal conferencing units whose user is currently speaking.

7. The personal conferencing unit as set forth in claim 1, wherein during the multi-point electronic conference, the integrated multi-point control logic further receives, holds and sends a video token that is being passed among the at least three personal conferencing units, with the holder of the video token being the primary video source for the multi-point electronic conference.

8. The personal conferencing unit as set forth in claim 7, wherein during the multi-point electronic conference, the integrated multi-point control logic allows outbound video to be multi-cast to a multi-cast destination address if the personal conferencing unit is the current holder of the video token, the multi-cast address being voluntarily subscribed to by the at least second and third personal conferencing units.

9. The personal conferencing unit as set forth in claim 7, wherein during the multi-point electronic conference, the integrated multi-point control logic allows outbound video to be point-to-point transmitted to one of the at least second and third personal conferencing units if the personal conferencing unit is the immediately preceding holder of the video token, the address of the point-to-point transmission being the one of the at least second and third personal conferencing units whose user is the current holder of the video token.

10. The personal conferencing unit as set forth in claim 7, wherein during the multi-point electronic conference, the integrated multi-point control logic passes the video token to one of the at least second and third personal conference units if the personal conferencing unit is the current video token holder, its user is not speaking, and a user of the one of the at least second and third personal conference units being passed the video token is currently speaking.

11. The personal conferencing unit as set forth in claim 7, wherein during the multi-point electronic conference, whenever the personal conferencing unit becomes the current holder of the video token, the integrated multi-point control logic holds on the video token for a predetermined amount of time.

12. The personal conferencing unit as set forth in claim 10, wherein during the multi-point electronic conference, whenever the personal conferencing unit becomes the current holder of the video token, the integrated multi-point control logic ensures a user of the personal conference unit has stopped speaking for a predetermined amount of time before passing on the video token.

13. A network of personal conferencing units comprising at least three personal conferencing units coupled to each other for conducting a multi-point electronic conference between the personal conferencing units, each personal conferencing unit having integrated multi-point control logic that operates to cooperate with multi-point control logic of the other personal conferencing units to collectively control audio and video distribution among the personal conferencing units during the multi-point electronic conference.

14. The network of personal conferencing units as set forth in claim 13, wherein during the multi-point electronic conference, each integrated multi-point control logic allows outbound audio on its personal conferencing unit to be multi-cast to a multi-cast destination address if speech is present in the outbound audio of its personal conferencing unit, the multi-cast address being voluntarily subscribed to by the other personal conferencing units.

15. The network of personal conferencing units as set forth in claim 13, wherein during the multi-point electronic conference, each integrated multi-point control logic allows a plurality of in-bound audio streams on its personal conferencing unit to be mixed together, and rendered.

16. The network of personal conferencing units as set forth in claim 15, wherein during the multi-point electronic conference, each integrated multi-point control logic allows only a subset of the in-bound audio streams on its personal conferencing unit to be mixed together, and rendered, and allows the remaining in-bound audio streams on its personal conferencing unit to be discarded.

17. The network of personal conferencing units as set forth in claim 13, wherein during the multi-point electronic conference, each integrated multi-point control logic allows outbound video of its personal conferencing unit to be multi-cast to a multi-cast destination address if a user of its personal conferencing unit is currently speaking, the multi-cast address being voluntarily subscribed to by the other personal conferencing units.

18. The network of personal conferencing units as set forth in claim 13, wherein during the multi-point electronic conference, each integrated multi-point control logic allows outbound video of its personal conferencing unit to be point-to-point transmitted to one of the other personal conferencing units if a user of its personal conferencing unit is an immediate predecessor speaker to a user of the one of the other personal conferencing units who is currently speaking, the address of the point-to-point transmission being the one of the other personal conferencing units whose user is currently speaking.

19. A machine implemented method for a personal conferencing unit to contribute to distributive control of audio distribution in a multi-point electronic conference, the method comprising: (a) during the multi-point electronic conference, allowing outbound audio on the personal conferencing unit to be multi-cast to a multi-cast destination address by integrated multi-point control logic of the personal conferencing unit if speech is present in the outbound audio, the multi-cast destination address being voluntarily subscribed by at least a second and a third personal conferencing unit of the multi-point electronic conference.

20. The machine implemented method as set forth in claim 19, wherein the method further comprises: (b) during the multi-point electronic conference, allowing a plurality of in-bound audio streams into the personal conferencing unit, from the at least second and third personal conferencing units, to be mixed together and rendered by integrated multi-point control logic of the personal conferencing unit.

21. The machine implemented method as set forth in claim 20, wherein (b) includes during the multi-point electronic conference, allowing only a subset of in-bound audio streams into the personal conferencing unit, from the at least second and third personal conferencing units, to be mixed together and rendered, and allowing the remaining in-bound audio streams to be discarded by integrated multi-point control logic of the personal conferencing unit.

22. The machine implemented method as set forth in claim, 19, wherein the method further comprises: (b) during the multi-point electronic conference, allowing outbound video of the personal conferencing unit to be multi-cast to a multi-cast destination address by integrated multi-point control logic of the personal conferencing unit if the personal conferencing unit's user is currently speaking, the multi-cast destination address being voluntarily subscribed to by the at least second and third personal conferencing units of the multi-point electronic conference.

23. The machine implemented method as set forth in claim 22 wherein (b) further comprises during the multi-point electronic conference, by an integrated multi-point control logic of the personal conferencing unit allowing outbound video of one of the at least second and third personal conferencing units to be point-to-point transmitted to the personal conferencing unit, the one of the at least second and third personal conferencing units being the one of the at least second and third personal conferencing units whose user was the last speaker.

24. A machine implemented method for a personal conferencing unit to contribute to distributively control video distribution in a multi-point electronic conference, the method comprising: (a) during the multi-point electronic conference, allowing outbound video of the personal conferencing unit to be multi-cast to a multi-cast destination address by integrated multi-point control logic of the personal conferencing unit if the personal conferencing unit is the current holder of a video token being passed among the personal conference unit and at least a second and a third personal conferencing unit of the multi-point electronic conference, the multi-cast destination address being a multi-cast address voluntarily subscribed to by the at least second and third personal conferencing units, and the current holder of the video token being the primary video source for the multi-point electronic conference.

25. The machine implemented method as set forth in claim 24, wherein the method further comprises (b) during the multi-point electronic conference, an integrated multi-point control logic of the personal conferencing unit allowing outbound video of one of the at least second and third personal conferencing units to be point-to-point transmitted to the personal conferencing unit, the one of the at least second and third personal conferencing units whose outbound video being point-to-point transmitted being the immediate predecessor holder of the video token.

26. The machine implemented method as set forth in claim 24, wherein, the method further comprises (b) during the multi-point electronic conference, passing the video token from the personal conferencing unit to one of the at least second and third personal conferencing units by integrated multi-point control logic of the personal conferencing unit if the user of the personal conferencing unit has stopped speaking, and a user of the one of the at least second and third personal conferencing units has started speaking.

27. The machine implemented method as set forth in claim 26, wherein the passing of the video token in (b) is performed only if the personal conferencing unit has possession of the video token for a period longer than a predetermined amount of time.

28. The machine implemented method as set forth in claim 26, wherein the passing of the video token in (b) is performed only if the user of the personal conferencing unit has stopped speaking for a period longer than a predetermined amount of time.

* * * * *